J. FORSHEIM AND J. KONIGSBERG.
LOCK.
APPLICATION FILED SEPT. 16, 1916.
1,334,950.
Patented Mar. 30, 1920.
2 SHEETS—SHEET 1.
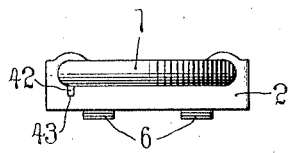
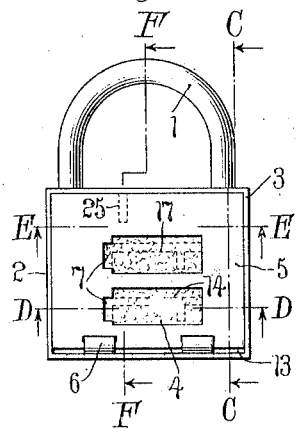
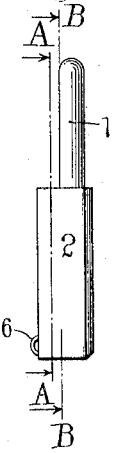
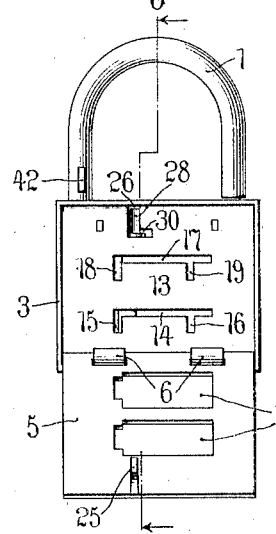
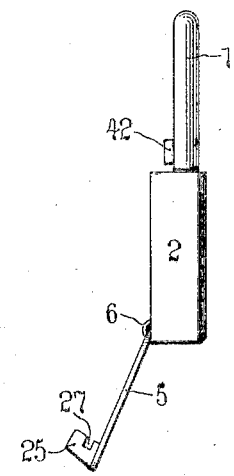
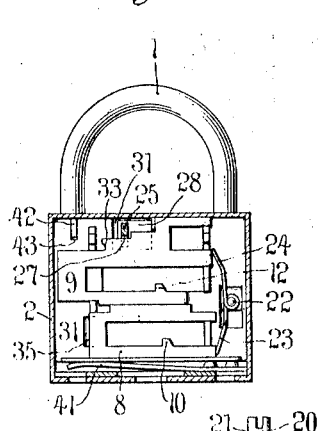
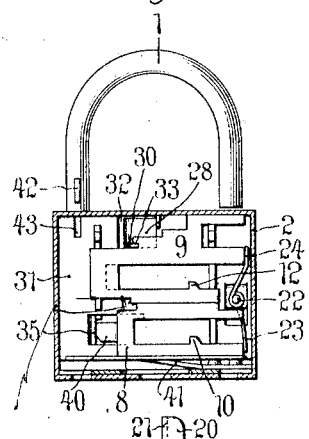
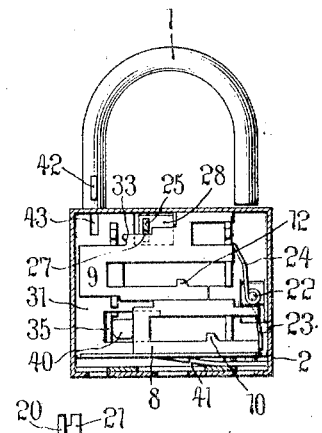
Witness:
Harry G. Fleischer
Inventors:
Joseph Forsheim
Joseph Konigsberg
by attorneys

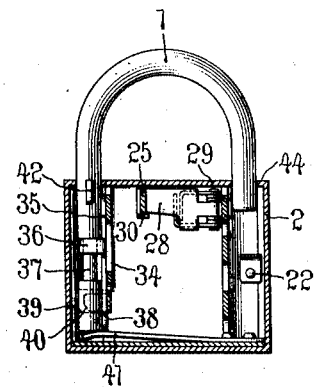
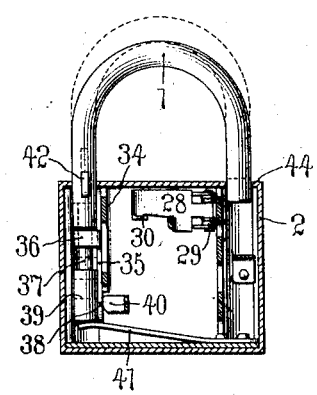
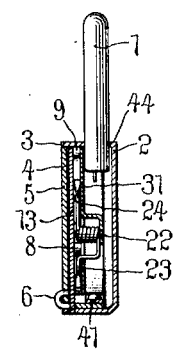
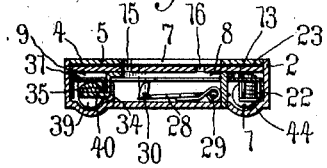
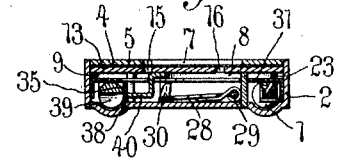
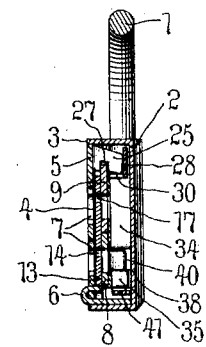
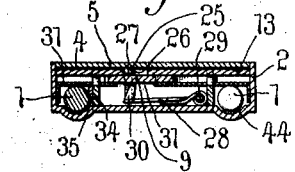
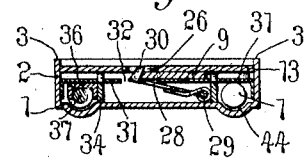
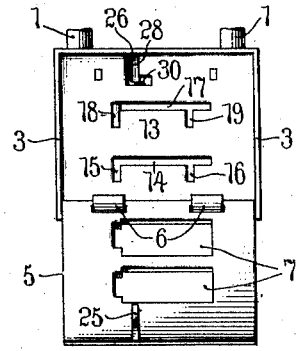
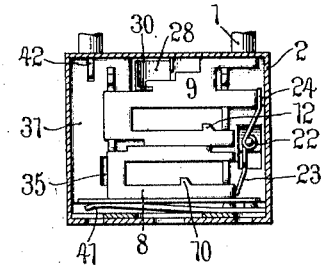
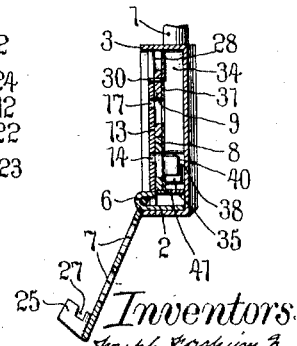

UNITED STATES PATENT OFFICE.

JOSEPH FORSHEIM, OF GREAT NECK, AND JOSEPH KONIGSBERG, OF NEW YORK, N. Y., ASSIGNORS TO LENA S. FORSHEIM, OF GREAT NECK, NEW YORK.

LOCK.

1,334,950.  Specification of Letters Patent.  Patented Mar. 30, 1920.

Application filed September 16, 1916. Serial No. 120,531.

*To all whom it may concern:*

Be it known that we, JOSEPH FORSHEIM and JOSEPH KONIGSBERG, citizens of the United States, and residents, respectively, of Great Neck, in the county of Nassau and State of New York, and the borough of Manhattan, in the city and State of New York, have invented a new and useful Improvement in Locks, of which the following is a specification.

This invention relates to seal locks of that type in which a protective strip is provided for the lock and in which the positioning means for the protective strip is controlled by a releasing device whereby the strip may be removed; access to the lock or to the releasing device being only obtained by a mutilation of the protective strip.

The object of our invention is to provide certain improvements in the construction, form and arrangement of the several parts of a seal lock of the above type, whereby an extended movement of the releasing device operating means is required before the positioning means for the protective strip can be released thus insuring such a complete mutilation of the protective strip as will absolutely prevent its further use.

Our invention also contemplates the provision of a structure in which the release of the shackle and the release of the positioning means is accomplished by the insertion of a key into the keyhole at one point and the withdrawal of the key from the keyhole at another point, the key having a bodily movement between said entrance and removal points.

A practical embodiment of our invention is represented in connection with a padlock, in which—

Figure 1 represents the lock in top plan,

Fig. 2 represents a view of the lock in front elevation,

Fig. 3 represents a side view,

Fig. 4 represents a front view with the shackle released and the cover of the positioning device released, Fig. 5 represents a side view of the same, Fig. 6 represents a section taken in the plane of the line A—A of Fig. 3, with the bolts for both the shackle and the cover in their locked position, Fig. 7 represents a similar view with the bolts for both the shackle and the cover in their released positions, Fig. 8 represents a similar view with the bolt for the shackle in its released position and the bolt for its cover in its locked position, Fig. 9 represents a section taken in the plane of the line B—B of Fig. 3, with the parts in the positions which they assume when both the shackle and the cover are locked, Fig. 10 represents a similar view with the parts in the positions which they assume when both the shackle and the cover are released, Fig. 11 represents a section taken in the plane of the line C—C of Fig. 2, Fig. 12 represents a section taken in the plane of the line D—D of Fig. 2, with the parts in the positions which they assume when both the shackle and the cover are locked, Fig. 13 represents a similar view with the parts in the positions which they assume when released and the cover locked, Fig. 14 represents a section taken in the plane of the line E—E of Fig. 2, with the parts in the positions they assume when both the shackle and the cover are locked, Fig. 15 represents a similar view with the parts in the positions they assume when both the shackle and the cover are released.

Fig. 16 represents a front view of the lock with the shackle locked and the cover released, Fig. 17 represents a section taken in the plane of the line A—A of Fig. 3, with the bolts in the positions they assume when the shackle is locked and the cover released, Fig. 18 represents a section taken in the plane of the line F—F of Fig. 2, Fig. 19 represents a section taken in the plane of the line G—G of Fig. 4, and Figs. 20, 21 and 22 represent views of a key which is designed for operating the bolts of both the shackle and the releasing device for the cover.

In the padlock in connection with which our invention is illustrated, the shackle is denoted by 1 and the casing by 2. The casing 2 is provided, on its front face, with a peripheral flange 3 serving as a holder for a protective strip 4 of paper or other suitable readily mutilated material. A cover 5 is hinged at 6 to the bottom of the casing at its front, which cover is arranged to snugly fit, when closed, within the peripheral flange 3 of the casing and act together therewith as a positioning means for the protective strip 4. This cover is provided with one or more holes 7 for exposing the protective strip 4 therethrough when the cover is closed. In the present instance, we have shown two of these holes 7.

The interior of the casing is provided with a sliding bolt 8 for locking and releasing the shackle 1 and with a sliding bolt 9 for locking and releasing the cover 5. The bolt 8 is provided with an abutment 10 arranged in position to be engaged by the key 11 to be hereinafter more fully described and the bolt 9 is similarly provided with an abutment 12 arranged to be engaged by the said key 11.

The front plate 13 of the casing within the cover 5 is provided with two keyholes of peculiar construction, the one for permitting the insertion of the key to manipulate the bolt 8 for the shackle 1 and the other for permitting the insertion of the key for manipulating the bolt 9 for the cover 5.

The keyhole for the bolt 8 comprises a horizontally elongated slot 14 having two vertical branches 15 and 16. Similarly, the keyhole for the bolt 9 comprises a horizontally elongated slot 17 and two short vertical branches 18 and 19.

The inner end of the key 11 comprises two flat portions 20, 21, arranged at right angles to each other. To release the shackle, the key is inserted into the keyhole at the short branch 15. As the key is moved laterally along the slot 14, its portion 21 will engage the abutment 10 of the bolt 8 just before the key reaches the short branch 16, of the keyhole. The further lateral movement of the key will move the bolt to release the shackle and the key may then be withdrawn through the branch 16. Similarly, the key may be inserted at the branch 18 and the key moved laterally along the slot 17. As the key approaches the branch 19, its portion 21 will engage the abutment 12 of the bolt 9 and the further movement of the key will move the bolt to release the cover 5. The key may then be withdrawn through the branch 19.

The means operable to throw the bolts to their locking position comprises a double branch spring secured at 22 within the casing, the branch 23 of which engages the rear end of the bolt 8 and the other branch 24 of which engages the rear end of the bolt 9.

The cover 5 is provided with a hook 25 on its inner face at its free end, which hook is adapted to enter a hole 26 in the front plate 13 of the casing. When the bolt 9 is thrown to the limit of its forward movement by its spring, the body of the bolt will extend into the recess 27 of the hook 25 and thus lock the cover closed. Means released by the insertion of the hook 25 into the hole 26 is provided for holding the bolt 9 at the limit of its rearward movement against the tension of its spring, which means comprises a spring latch 28 pivoted at 29 within the casing and provided with a hook 30. This hook 30 is arranged to pass through a hole 32 in a partition 31 in the casing into a recess 33 in the bolt 9 when the bolt is at the limit of its rearward movement, thus holding the bolt in said position. This hook 30 is arranged opposite the opening 26 in the front plate 13 so that as the hook 25 of the cover 5 is pressed into the hole 26 by the closing of the cover 5 the hook 30 of the latch will be forced out of its engagement with the bolt 9 thereby releasing the bolt and permitting its spring to return the bolt into locking engagement with the hook 25 of the cover.

The shackle 1 is locked and released as follows: A cross partition 34 is located within the casing and a slide 35 is provided adjacent to the long arm of the shackle 1, which slide 35 is provided with a lug 36 through an aperture which a reduced portion 37 of the long arm of the shackle has a limited sliding movement. The slide 35 is provided with a recess 38 and the long arm of the shackle is provided with a corresponding recess 39. When the slide and the recess are at the limit of their inward movements, the said recesses 38 and 39 are brought into alinement with the nose 40 of the bolt 8 and the bolt may be thrown by its spring to the limit of its forward movement into locking engagement with said slide and shackle. A spring 41 is located within the casing, the free end of which spring bears against the inner ends of the slide 35 and long arm of the shackle 1 tending to move their recesses 38 and 39 out of alinement with the nose 40 of the bolt 8 when the bolt is moved to the limit of its rearward movement by the action of its key.

The bolt is held at the limit of its rearward movement by the slide 35. This will permit the shackle to be withdrawn a sufficient distance to bring the short arm of the shackle out of its locking engagement with the casing and also bring the feather 42 of the long arm of the shackle out of its slot 43 to permit the lateral swinging movement of the shackle on its long arm. The lug 36 of the slide 35 limits the outward movement of the long arm of the shackle. When it is desired to lock the shackle, the shackle is swung to bring its short arm into alinement with its hole 44 in the top of the casing. The shackle is then forced inwardly against the tension of the spring 41. This inward movement of the shackle will also cause the slide 35 to move inwardly by the engagement of the long arm of the shackle with the lug 36 of the slide. When the recesses 38 and 39 have been brought into alinement with the nose 40 of the bolt 8, the said nose will enter said recesses and hold the shackle locked.

It will thus be seen that the releasing device for the cover 5 is entirely separate from the lock for the shackle and is operated separately. In use, a protective strip of paper or other suitable material which can be readily punctured and mutilated, is placed against the front plate 13 of the lock over the keyholes. The cover 5 is then closed and locked. The protective strip therefore conceals both the keyhole for the shackle lock and the keyhole for the cover releasing means. This protective strip is disclosed through the hole or holes 7.

Should it be desired to release the shackle, the key is pressed through the protective strip into the shackle lock keyhole at the branch 15. The key is then moved laterally a considerable distance to throw the bolt 8, as hereinbefore described, and is then withdrawn at the branch 16. This insertion of the key at one point and its withdrawal at another point distant from the insertion point, insures a very complete mutilation of the protective strip before the shackle is released.

To insert a new protective strip, the key is inserted into the releasing device keyhole at the branch 18 and is then moved laterally a considerable distance to throw the bolt 9 to release it from engagement with the hook 25 of the cover and the key is withdrawn from the keyhole at the branch 19. The mutilated strip may then be removed and a new strip placed in position and the cover again closed and locked.

From the above description, it will be seen that the releasing device for the cover may be operated by the puncturing and mutilation of the protective strip for the purpose of introducing a new strip, for instance, without releasing the shackle.

It will also be seen that the protective strip serves as a detector for indicating visually the fact that either the lock or the protective strip has been tampered with, should such be the case.

When the bolt 9 is thrown back to release the cover 5, the cover will be forced open by the engagement of the hook 30 of the spring latch with the hook 25 of the cover.

It is to be understood that the key referred to herein may be any device operable to throw the bolt.

It is evident that slight changes may be resorted to in the form, construction and arrangement of the several parts without departing from the spirit and scope of our invention; hence we do not wish to limit ourselves strictly to the structure herein set forth, but

What we claim is:

1. A key lock having separate key insertion and withdrawal points and a protective strip for said lock requiring mutilation for gaining access to the lock.

2. A key lock having separate key insertion and withdrawal points, a protective strip for said lock requiring mutilation for gaining access to the lock, positioning means for the strip and a separate releasing device for the positioning means operable independently of the lock.

In testimony, that we claim the foregoing as our invention, we have signed our names this 25th day of July 1916.

JOSEPH FORSHEIM.
JOSEPH KONIGSBERG.